March 18, 1969 H. MINTEN 3,432,981
METHOD OF AND APPARATUS FOR PACKING, PREFERABLY OF TEXTILE
LAPS OR BALES IN DOUBLE PLASTIC FILMS
Filed May 15, 1967
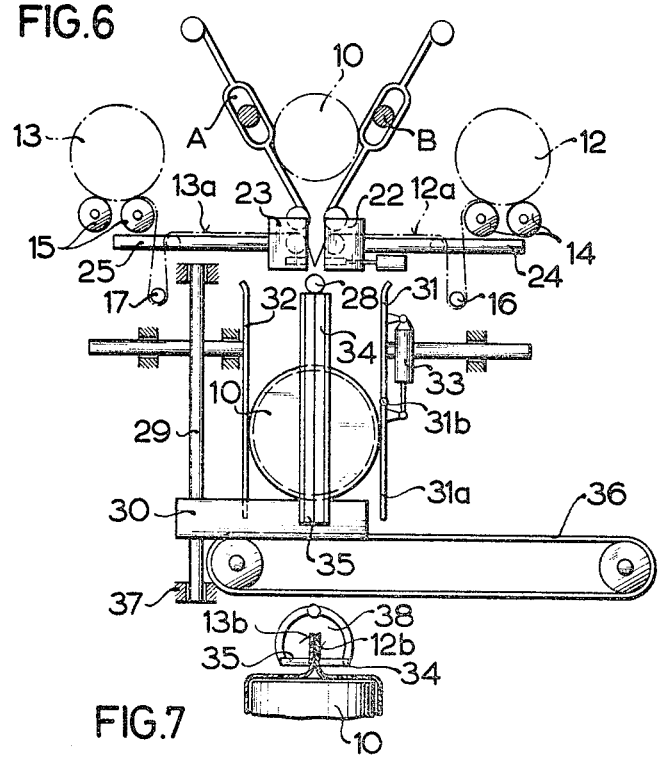
FIG.6
FIG.7
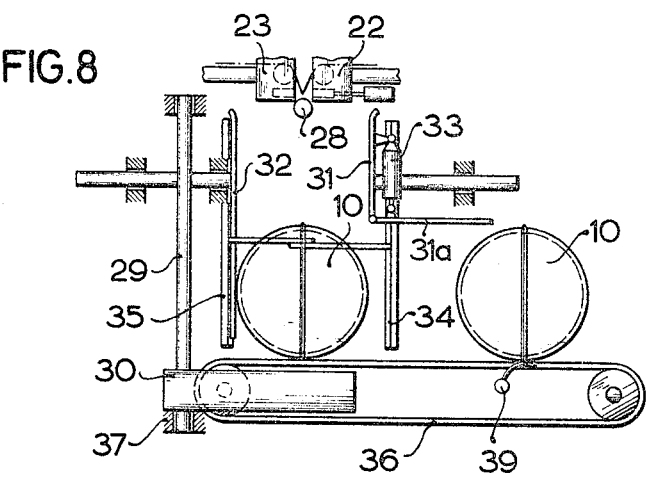
FIG.8
INVENTOR

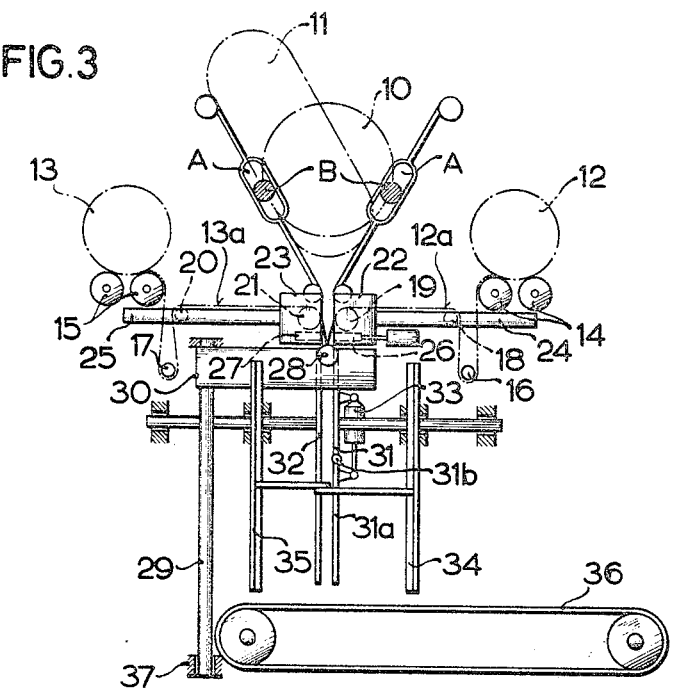

United States Patent Office 3,432,981
Patented Mar. 18, 1969

3,432,981
METHOD OF AND APPARATUS FOR PACKING, PREFERABLY OF TEXTILE LAPS OR BALES IN DOUBLE PLASTIC FILMS
Hans Minten, Suchteln, Germany, assignor to Johannes Menschner, Textilmaschinenfabrik, Dulken, Germany, a corporation of Germany
Filed May 15, 1967, Ser. No. 638,299
U.S. Cl. 53—33                                            5 Claims
Int. Cl. B65b *11/06, 53/02*

ABSTRACT OF THE DISCLOSURE

A method of and apparatus for packing of material, such as textile laps or bales of various heights in double films welded together at their cut edges, wherein the material to be wrapped is lowered through at least a distance equal to the height of the material and thereupon and directly in response thereto an upper welding of intermediate portions of the films is commenced about the top of the material.

---

The present invention relates to a method of and apparatus for packing textile laps or bales, in general, and to a method of and apparatus for packing textile laps or bales with double films, in particular.

It is known to pack sales articles with plastic film. For this there may be used, for instance, a double-film wrapping in which one operates from two film supply rolls, the transverse cut edges of the two film rolls being moved towards each other and welded together at their region of contact, thus creating a connecting seam between the two sheets of film. The material to be packed is then dropped from above onto this seam, the material being lowered together with the additional sections of sheeting which are pulled from the supply rolls, followed then by a welding of the sections together and shaped around the material to be wrapped.

It is one object of the present invention to provide a method of and apparatus for wrapping textile laps or bales, which suitably and effectively improves the welding and wrapping of said articles.

It is another object of the present invention to provide a method of and apparatus for textile laps or bales, wherein a first operating step, after the lowering of the laterally guided material to be packed over a positively controlled lowering stroke corresponding at least to the height of the material to be packed, there is effected the upper longitudinal, as well as separating, welding of the circumferentially wrapped material from the sheetings and whereupon the material to be wrapped is lowered in a second step and welded together there at its ends, and thereupon after further lowering, in a third step, the material which is now circumferentially wrapped and welded is discharged onto a conveyor means which is positively controlled by the lowering and which feeds the wrapped material to a known heating device effecting a shrinkage of the wrapping film.

A definite advantage of the method of the present invention is that materials to be wrapped of different length and height can be dependably and efficiently wrapped. This is achieved since the stroke for the lowering of the material to be wrapped down to its first step is positively controlled by a monitoring contact in such a manner that the lowering stroke of the material to be wrapped is dependent on the actual height of the material itself. For this reason, therefore, any materials to be wrapped, such as in the present invention, round and flat rolls, can be fed and wrapped either separately or together.

It is another object of the present invention to provide an apparatus which carries out the method of the invention for the receiving and transferring of the material to be wrapped through the individual working steps, comprising a supporting arm which is guided upwardly and downwardly on a vertical guide column and itself initiates control functions for the further handling of the material being wrapped, the supporting arm being monitored in its downward stroke by a monitoring control contact, for instance a light beam, the light beam being arranged in a plane below the welding device for the upper longitudinal and separation welding.

Thus, the material to be wrapped which has been initially fed, drops onto the supporting arm which is controlled in its lowering stroke; and the lowering stroke thereof is terminated when the monitoring contact, for instance the light beam, is unblocked, which occurs when the supporting arm together with the material to be wrapped is lowered sufficiently, so as to pass over its entire height beyond the light beam. The lowering position is accordingly determined solely by the height of the material to be wrapped. In this connection, a material of round shape, for instance, will undergo a longitudinal and separation welding at an earlier time than in the case of a material of flat, elongated shape of greater height.

It is still another object of the present invention to provide a wrapping apparatus in accordance with the above-mentioned objects, wherein the lateral guides for the material to be wrapped are in the form of displaceable guides movable in a horizontal plane, one of the two guides being developed over parts of its height as a flap guide which is pulse controlled for the actuation of its opening, causing the formation of a passage for the removal of the welded and wrapped material. This is important because after the end welding of the wrapped material, the lap or bale, which is now completely wrapped, is discharged onto a conveyor device, and the flap is caused to open so that the wrapped lap or bale can be removed, for passage into, for instance, a shrinkage tunnel.

The supporting arm which supports the material being wrapped during the entire lowering stages, at the end of its lowering stroke actuates the conveyor device so that the wrapped material can be conveyed away from the wrapping apparatus.

It is still another object of the present invention to provide an apparatus for the wrapping of textile laps in accordance with the above-mentioned objective, wherein in the region centrally opposite the lateral guides, is provided a pair of welding jaws, with positive stroke adjustment to the length of the material being wrapped, each having a height corresponding to the height of the lateral guides and having associated therewith a suction exhaust for pieces of sheeting which have been cut off.

Since in this manner the welding jaws have a height which extends over the entire height of the lateral guide, the welding jaws can also accommodate different heights of materials to be wrapped. In addition, the welding jaws may also, individually or at least a pair thereof, be positively stroke-controlled for adjustment to the length of the material to be wrapped, which result could be obtained for instance by an additional monitoring contact such as a light barrier or the like.

With the method of the present invention and by the apparatus of the present invention by which the method may be carried out, it is possible with extremely simple but particularly effective means to wrap materials of different dimensions with respect to width, height and length in a single apparatus completely automatically by a self-monitoring control device by means of a monitoring contact. In this manner the apparatus can adjust itself completely automatically and individually to the specific material which is to be wrapped at the moment so that every material to be wrapped whether it be a round or flat lap or bale can be dependably surrounded by the wrapping film and tightly welded.

With these and other objects in view which will become apparent in the following detailed description, the present invention will be clearly understood in connection with the accompanying drawings, in which:

FIGURE 1 is a perspective view of a round lap which may be wrapped in accordance with the present invention;

FIG. 2 is a perspective view of a flat lap which may be wrapped in accordance with the present invention;

FIG. 3 is a schematic showing of a wrapping device in accordance with the present invention in which both a round lap and a flat lap are shown in the feed for the material to be wrapped, the apparatus being shown in the initial phase of its operation;

FIG. 6 shows the package with its circumference already wrapped and in further lowered position during the end welding;

FIG. 7 is a partial top view of the jaws which effect the end welding together with a suction system for the drawing off of the waste pieces of film; and FIG. 8 shows the completely welded round lap being transported away, with another lap already being present on the discharge belt.

Figure 4:
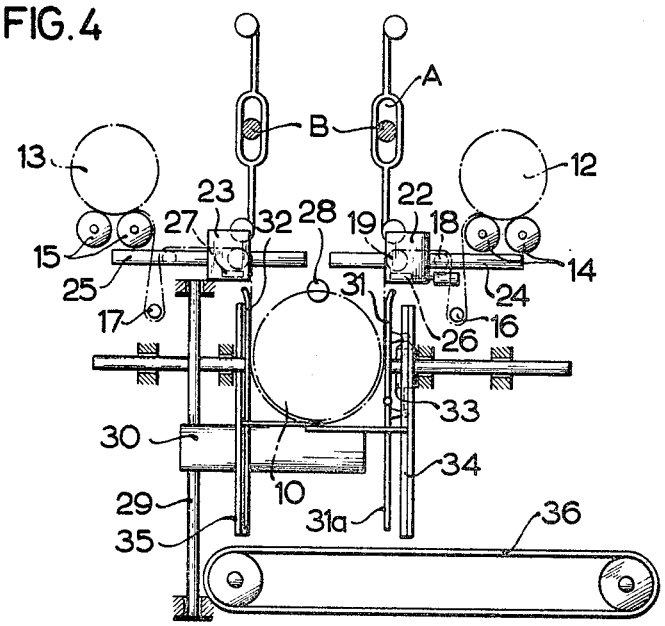
FIG. 4 shows another phase of operation of the apparatus of FIG. 3 of the present invention, the round lap having already been lowered by the supporting arm prior to longitudinal and separation welding.

Referring now to the drawings, and more particularly to FIGS. 1-3, the materials which are to be wrapped with the apparatus of the present invention will generally be a round lap 10 (FIG. 1) or a flat lap 11 (FIG. 2). The apparatus is provided with a supply of continuous sheeting 12 and 13, respectively, arranged opposite each other and resting on pull-off rollers 14 and 15, respectively. Sections of sheeting 12a and 13a are pulled off from the supply rolls 12 and 13 and travel from the pull off rollers 14 and 15, respectively, over so-called compensating rollers 16 and 17 as well as guide rollers 18, 19 and 20, 21, respectively.

The guide rollers 19 and 21 are located within slide-shaped guide jaws 22 and 23 which are guided on guides 24 and 25. The length of sheeting 12a and 13a protrudes somewhat, as illustrated, beyond the guide rollers 19 and 21 so that they can be welded together by means of the welding jaws 26 and 27 constituting a welding device. Below the welding device, there is a monitoring contact 28, for instance the photocell of a light barrier.

On a vertical guide column 29 there is provided a positively stroke-controlled supporting arm 30 which can be raised and lowered and which supports the material 10 or 11 to be wrapped and guides it through all operating stages, located one below another in a vertical plane. In the operating region of the individual operating stages, there are provided lateral guides 31 and 32 which are adjustable. One of the two lateral guides, for instance the guide 31, is a swingable guide 31a and can be swung upwardly around the pin designated 31b by a drive mechanism 33 so that the welded wrapped material 10 or 11 can come out of the lateral guides.

The welding jaws 34 and 35 can also be moved and adjusted and are able to weld the material to be wrapped at both ends. In this case, one pair of the welding jaws is arranged on each side.

In a plane below the lateral guides, there is a conveyor belt 36 which is positively controlled by the supporting arm 30 in its bottom lowering position so as to be able to discharge the completely wrapped material from the apparatus.

The operation of the wrapping proceeds as follows:

The two supply rolls 12 and 13 (FIG. 3) of flat film are initially placed on the pull-off rollers 14 and 15. Thereupon, the sheeting 12a and 13a are pulled over the compensating rollers 16 and 17 as well as the guide rollers 18, 19 and 20, 21, respectively, until about, for example, 10 cm. protrudes downward through the two welding jaws 26 and 27. By a switch (not shown), the two welding jaws 26 and 27 are then moved together and the two starting ends of the rolls are welded together. There is produced here a separating weld. The protruding piece of sheeting which drops off is removed from the machine. The welding jaws 26 and 27 then move back into the end position, whereby the machine is ready for the next operation.

A lap 10 (FIG. 1) or lap 11 (FIG. 2) is then placed in the feed A by a conveyor belt (not shown) or an attendant. By means of a manual, mechanical or electrical control device, the operation of the machine is then started. First, the control jaws 22 and 23 together with the lateral guides 31 and 32 open up simultaneously with the feed A permitting the unimpeded falling downwardly of the material to be wrapped, as shown in FIG. 4.

Figure 5:
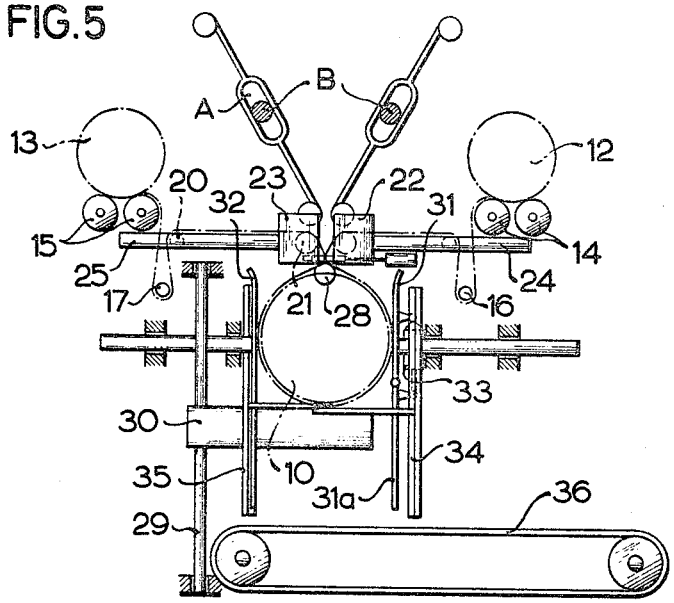
FIG. 5 shows another phase of the operation in which the upper longitudinal and separation welding is just being carried out.

The material to be wrapped, for instance, lap 10, drops down to the supporting arm 30 and thereby actuates a contact which on the one hand stops the moving apart of the jaws 22 and 23 and on the other hand commences the lowering of the supporting arm 30. In this way the beam of light of the photocell 28 is still interrupted by the supporting arm 30 and by the lap 10 or 11 thereupon. The supporting arm 30 descends further (depending upon the diameter of the lap or the height of the lap) until the beam of light of the photocell 28 is released, which causes the lowering stroke of the supporting arm 30 to be terminated; and, by a control, the jaws 22 and 23 are then moved together again as shown in FIG. 5. The lateral guides 31 and 32 retain their position.

With the lowering of the lap 10 (or 11) as well as the moving together of the jaws 22 and 23, there is unwound from the supply rolls 12 and 13 over the compensating rollers 16 and 17 and the conveyor rollers 18 and 19, and 20 and 21, as much film as is necessary for the wrapping. After the jaws 22 and 23 are moved together, the welding jaws 26 and 27 are brought together via contact, whereby a separating longitudinal welding is produced. This separation-welding welds together the films 12a and 13a from the supply rolls 12 and 13 and places the film around the lap 10 or 11 and simultaneously cuts them in the center of the weld seam, so that when the welding jaws 26 and 27 are subsequently separated the lap is separated from the supply sheeting.

Referring now again to the drawings and more particularly to FIG. 6, when the welding jaws 26 and 27 are moved back into their initial position, the lowering process of the supporting arm 30 commences again and lowers the arm to the next operating step in which the end welding is effected. When this position has been reached, welding jaws 34 and 35 are moved towards each other by a control contact (not shown). After completion of the welding and as soon as the welding rails 34 and 35 are again in their initial position, the roll is lowered further by the supporting arm 30 until the roll is deposited on conveyor belt 36 and the supporting arm 30 strikes against a stop 37 (FIG. 8).

After the end welding, the protruding excess sheeting 12b and 13b (FIG. 7) is again separated from the welding roll by a separation-welding and drawn off by a suction device 38. As soon as the supporting arm 30 comes against the stop 37, the lower part 31a on the lateral guide 31 is moved upwardly and the conveyor belt 36 is actuated. The roll can now be removed through the opened flap 31a.

The lap actuates a switch 39 which returns all the parts back into their initial position. By a switching, the new operation is automatically started when the next lap to be wrapped enters into the feed A. By a separate transport system, the wrapped lap upon leaving the wrapping machine is fed to a shrinkage tunnel in which the sheet which still lies loosely around the lap is closely shrunk around the material to be wrapped at a predetermined temperature.

While I have disclosed one embodiment of the present invention, it is to be understood that this embodiment is given by example only and not in a limiting sense, the scope of the present invention being determined by the objects and the claims.

I claim:

1. A method of packing of material such as textile laps and bales and the like in double films, comprising the steps of:

welding transversely extending cut edges of two oppositely disposed film sheetings to form a welded seam, lowering the material to be wrapped horizontally onto said welded seam, further lowering said material to be wrapped on said welded seam in a laterally guided and positively controlled lowering stroke through a distance at least equal to the height of said material to be wrapped, said two film sheetings being pulled relatively upwardly about the side of said material to be wrapped, thereupon and in response to the termination of said latter step, longitudinally welding and separating said two film sheetings about and at the top of said material to be wrapped at intermediate portions of said two film sheetings, thereby effecting a circumferential wrapping of said material to be wrapped, further lowering said material and then welding the lateral ends of the film on said material, discharging the wrapped material onto a conveyor device means and actuating said conveyor device by the lowering of said material, and heat shrinking the wrapping film on said material.

2. An apparatus for wrapping of material such as textile laps and bales and the like in double films, comprising:

feeding means for the material to be wrapped, film welding means disposed below said feeding means, a source of horizontally aligned film rolls including film sheetings and a support therefor and means for pulling-off and feeding said film sheetings, respectively, thereon to adjacent of said film welding means, a supporting arm means including a vertical guide column and disposed under said feeding means for receiving said material to be wrapped thereon and for lowering said material to be wrapped and for rising, control means adapted to be actuated by the lowering of said supporting arm, and a monitoring means for controlling said film welding means and responsive to the height of said material to be wrapped for actuating said film welding means after said material to be wrapped is lowered via said supporting arm at least through a distance at least equal to the height of said material to be wrapped for welding together intermediate portions of the two film sheetings about the top of said material to be wrapped.

3. The apparatus, as set forth in claim 2, wherein:

said monitoring means comprises a photoelectric control including a source of light emanating a beam of light for controlling said film welding means, said photoelectric control oriented so that said beam of light is directed in a horizontal plane below said film welding means, said material to be wrapped blocking the beam of light when being lowered via said supporting arm adjacent thereto and unblocking the beam of light when the top of said material to be wrapped passes below the beam of light, and said photoelectric control actuates said film welding means, when said material to be wrapped passes below the beam of light for welding together intermediate portions of the two film sheetings about the top of said material to be wrapped.

4. The apparatus, as set forth in claim 2, further comprising:

Lateral guide means including two oppositely disposed vertical guides positioned below said feed and horizontally movable apart for laterally guiding said material to be wrapped when it is lowered upon said supporting arm, one of said two oppositely disposed vertical guides including a flap guide thereon for opening and adapted to permit removal of wrapped material therethrough, and means for controlling said flap guide and constituting one of said control means.

5. The apparatus, as set forth in claim 2, further comprising:

lateral guide means including two oppositely disposed vertical guides positioned below said feeding means and horizontally movable apart for laterally guiding said material to be wrapped when it is lowered upon said supporting arm, two pairs of end welding jaws disposed centrally opposite to said lateral guide means, said pairs of end welding jaws having a height substantially equal to the height of said lateral guide means and having a welding stroke adjustable to the length of the film to be welded, and suction system means for removing cut pieces to film during welding by said pairs of end welding jaws.

References Cited

UNITED STATES PATENTS 2,639,567    5/1953    Murdoch et al. _____ 53—182 X

FOREIGN PATENTS 988,508    4/1965    Great Britain.

THERON E. CONDON, *Primary Examiner.*

E. F. DESMOND, *Assistant Examiner.*

U.S. Cl. X.R.

53—30, 75, 229